May 29, 1951 E. S. MARIS 2,554,950

TONE ARM MOUNTING

Filed June 20, 1946 3 Sheets-Sheet 1

INVENTOR
Elwood S. Maris
BY
C.D. Tuska
ATTORNEY

TONE ARM MOUNTING

Filed June 20, 1946 3 Sheets-Sheet 2

INVENTOR
Elwood S. Maris
BY
[signature]
ATTORNEY

May 29, 1951 E. S. MARIS 2,554,950

TONE ARM MOUNTING

Filed June 20, 1946 3 Sheets-Sheet 3

INVENTOR.
Elwood S. Maris
BY C. D. Tuska
ATTORNEY

Patented May 29, 1951

2,554,950

UNITED STATES PATENT OFFICE 2,554,950

TONE ARM MOUNTING

Elwood S. Maris, Upper Darby, Pa., assignor to Radio Corporation of America, a corporation of Delaware Application June 20, 1946, Serial No. 678,077

7 Claims. (Cl. 274—9)

Some of the objects of the present invention are: to provide an improved mounting for the tone arm of a record player; to provide a novel mechanism for locking a tone arm in rest position; to provide an automatic control for the mounting of a tone arm when the latter is moved to playing position; to provide a mounting for a tone arm wherein provision is made for automatically lifting the tone arm to playing position; to provide a mounting for a tone arm which automatically operates to latch a tone arm in both its rest and playing positions; and to provide other improvements as will hereinafter appear.

Figure 5:
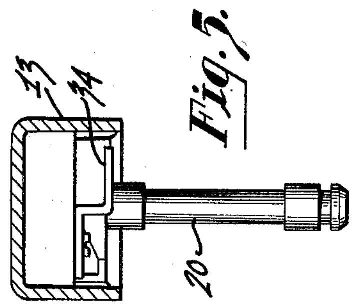
Figure 4:
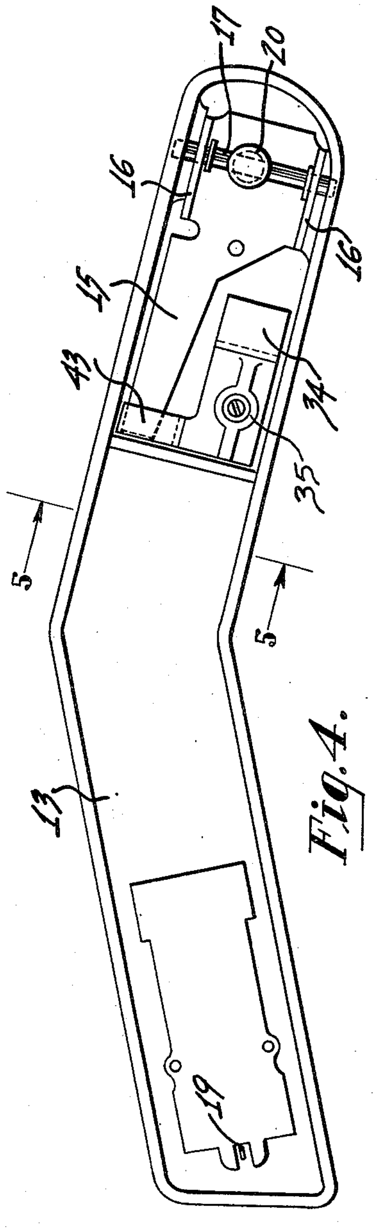
Figure 1:
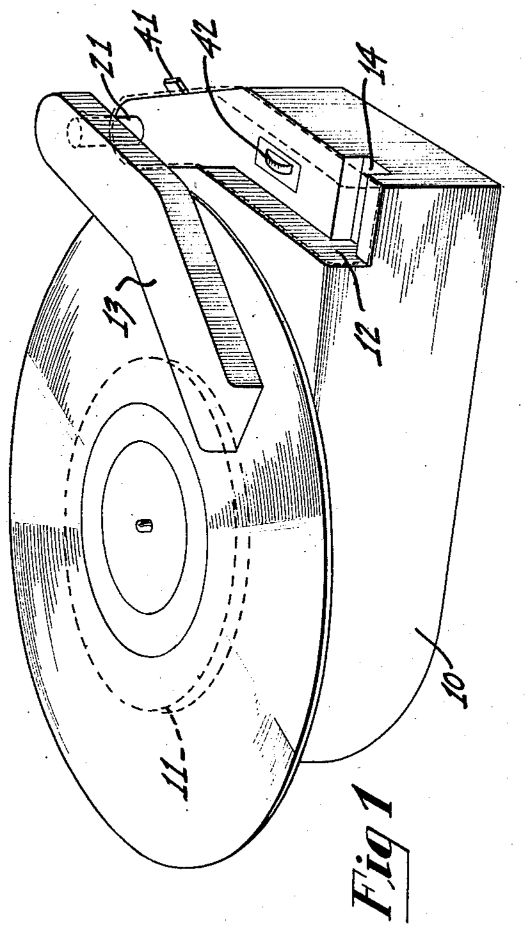
Figure 2:
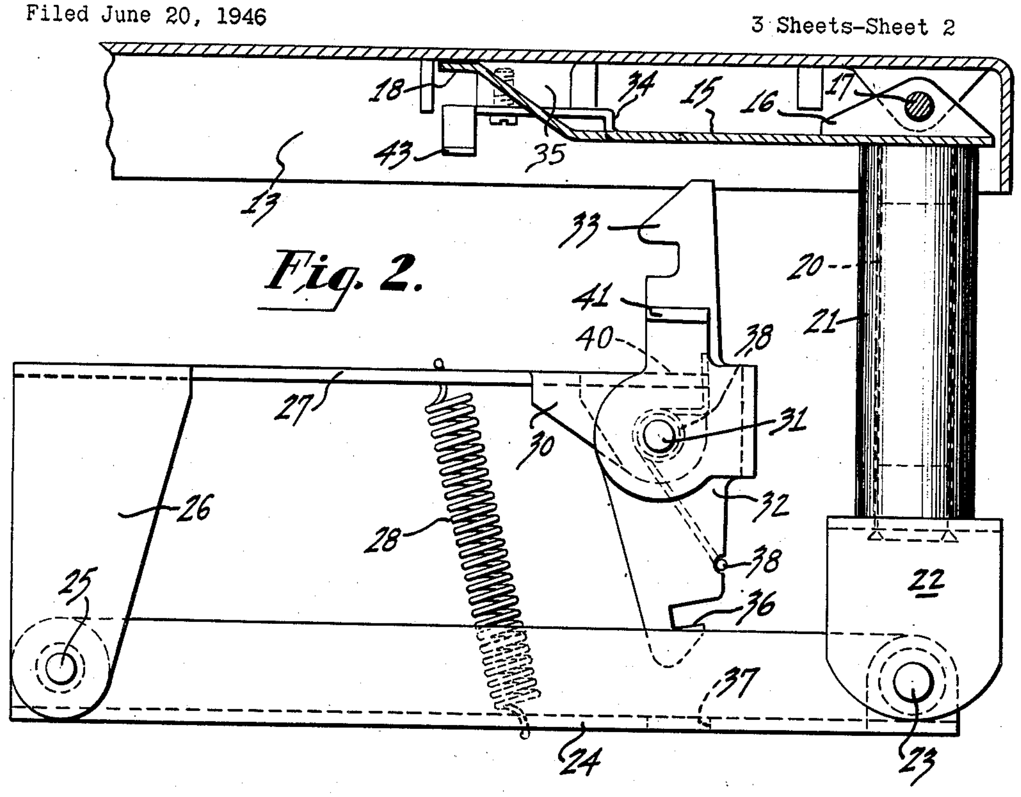
Figure 3:
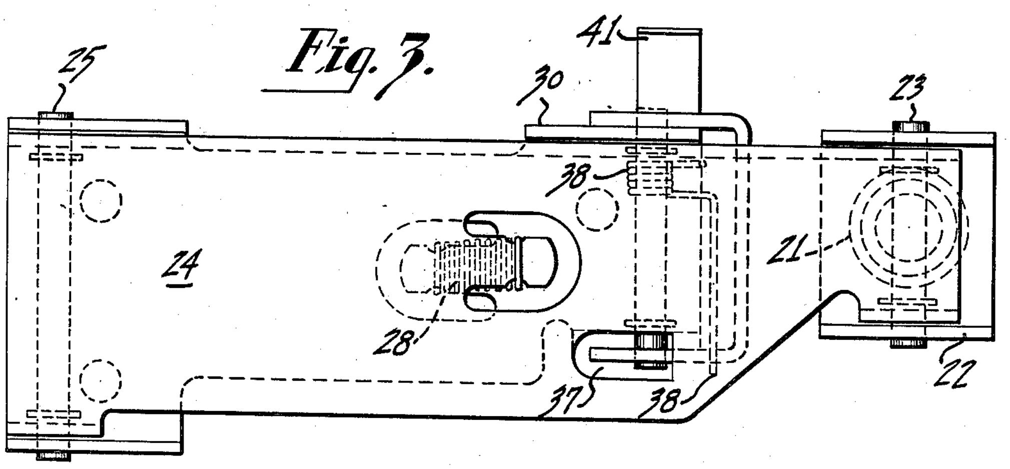
Figure 6:
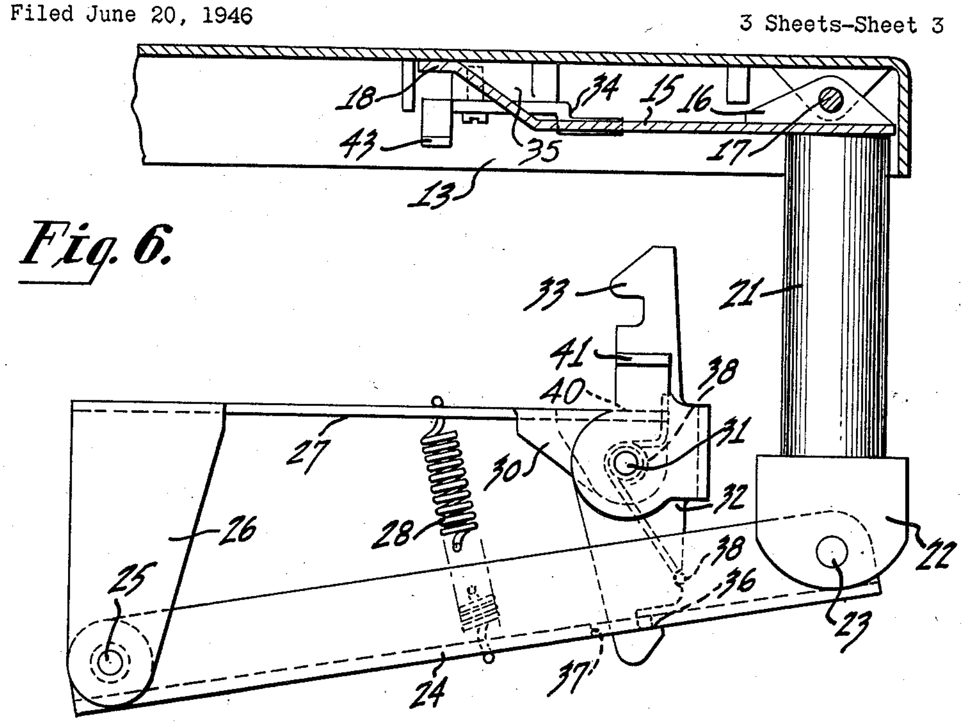
Figure 7:
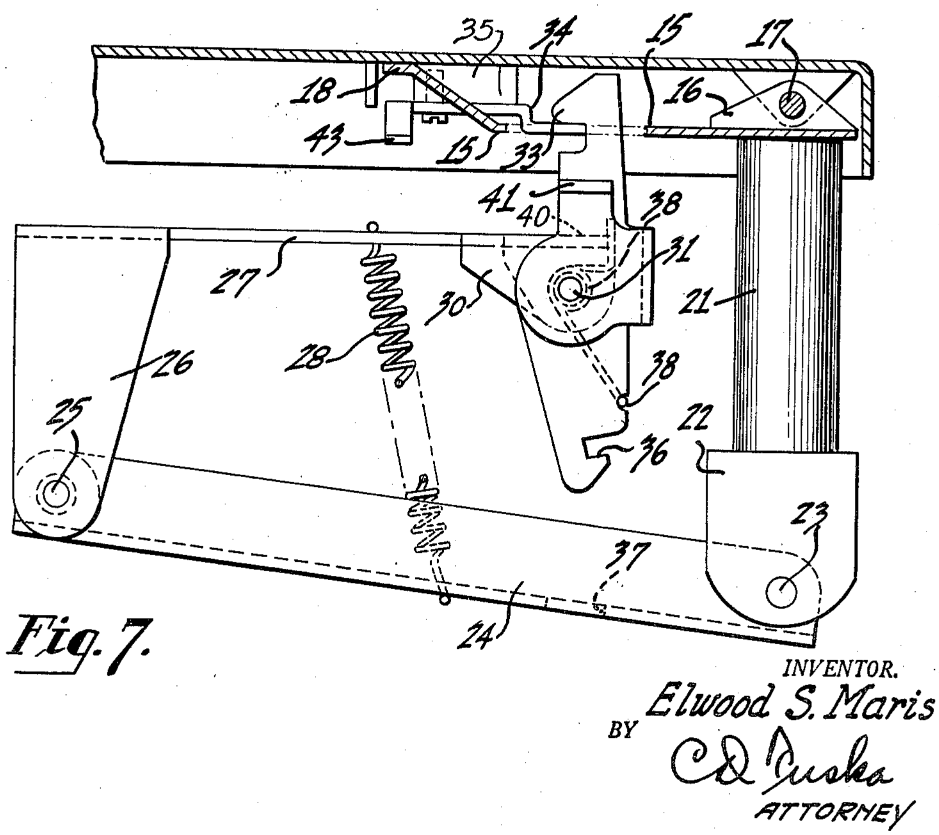

In the accompanying drawings, Figure 1 is a perspective of a record player embodying one form of the present invention and wherein the tone arm is shown in playing position with the rest position indicated by dotted lines; Figure 2 is a side elevation, partly in section, and on an enlarged scale showing the tone arm and its actuating mechanism in the intermediate position; Figure 3 is a bottom plan of the parts shown in Figure 2; Figure 4 is a bottom plan of the tone arm; and Figure 5 is a section on line 5—5 of Figure 4; Figure 6 is a view similar to Figure 2 with the tone arm locked in the upper position, and Figure 7 is a view similar to Figure 2 with the tone arm locked in the lowered position and with a portion of the tone arm broken away.

Referring to the drawings one form of the present invention comprises a case 10 arranged to house the usual sound reproducing equipment including the motor which operates the turntable 11. The upper face of the case 10 is provided with an elongated recess 12 having a contour which is complemental to the contour of a tone arm 13 and of such a depth as to bring the plane top and plane side of the tone arm 13 into the respective planes of the top and side of the case 10, so that in effect the exposed faces of the tone arm respectively form continuations of the top and side of the case 10. Thus when the player unit is not being used the rest position of the tone arm 13 will be in the recess 12 and the player unit will appear as a compact assembly of uniform pleasing contour due to the absence of projecting tone arm parts.

In order to prevent damage to the record needle when the tone arm is in its rest position, the recess 12 is provided with an end well 14, over which the pick-up 19 of the tone arm 13 is positioned in its rest position, and the depth of this well 14 is such that a clearance is formed between the needle and the bottom of the well 14.

In the preferred form of the invention the tone arm 13 is of channel shape to provide a conduit for the pick-up wires which lead to the sound reproducing unit (not shown) and also to receive a latch bracket 15 having ears 16 respectively journalled on a pin 17 extending transversely of the tone arm channel to form a horizontal pivot for the tone arm 13. The bracket 15 has a forward upwardly disposed extension 18 forming a support for the tone arm 13.

In order that the tone arm 13 can be removed from the recess 12 for movement to playing position the bracket 15 is apertured adjacent the ears 16 to receive the upper end of the journal pin 20 which is suitably anchored to the bracket 15 as will be understood. This pin 20 is arranged to enter a vertically disposed tubular post 21 carried by a yoke 22, which latter is pivotally mounted on a horizontally disposed pivot pin 23 traversing the side flanges of a lift arm 24. The opposite end of the lift arm 24 is pivoted to a horizontally disposed pin 25 mounted in ears 26 depending from a frame plate 27, which in assembled position is fixed to the bottom of the top of the case 10.

For automatically lifting the arm 24 to elevate the tone arm 13 to playing position, a coiled spring 28 is stretched between the plate 27 and the arm 24, the arrangement being such that when the tone arm 24 is in rest position the spring 28 will be biased to lift the arm 24 when the latter is released.

For the purpose of latching the tone arm in rest position the plate 27 is provided with side flanges 30 which form journals for a pin 31 to which a latch 32 is attached. The upper end of the latch 32 is provided with a cammed hook 33 positioned to snap around one end of a latch plate 34, which is secured to a boss 35 on the tone arm 13 in rest position. The opposite end of the latch 32 is also provided with a latching hook 36 oppositely disposed with respect to the hook 13 and arranged to enter a slot 37 in the base of the arm 24 when the latter is elevated to bring the tone arm 13 to playing position. A coil spring 38 encircles the pin 31 and is biased to return and maintain the pin and the two hooks in latching position. A stop strip 40 straddles the flanges 30 to form an abutment in the path of the latch 32 to limit the latch movement under the action of the spring 38 and is pivoted on the pin 31.

From the foregoing it will be seen when the tone arm 13 is lowered to rest position that the latch hook 33 will snap over the end of the plate 34 and thus hold the tone arm until released. When it is desired to play a record the latch 32 is released by manually shifting an upstanding finger 41 which is formed as a part of the stop strip 40 and is located in a convenient position beside the tone arm 13 for ready manipulation. When the latch 32 is released the spring 28 elevates the arm 24 into a fixed upper position to bring the tone arm 13 to a position where it can be swung laterally with the pin 20 as a vertical axis to playing position above a record on the turntable. When in this position the lower latch hook 36 snaps through the slot 37 to latch against the arm 24 and hold it in elevated position while the record is being played.

A volume control knob 42 is preferably located in the recess 12 for ready access and thus in rest position of the tone arm there are no exterior obstructions, other than the turntable.

In order to limit the upward swing of the tone arm 13, the end of the plate 34 is provided with a stop arm 43 projecting laterally beneath the bracket 15 and arranged to engage the lower side of the extension 18 when the tone arm 13 has reached its proper elevation.

It will now be apparent that a complete unitary record player case and tone arm have been devised wherein the latter in rest postion is so arranged that exposed portions thereof form continuations of the adjacent surfaces of the case, while mechanism of a novel character is provided for controlling the two positions of the tone arm.

I claim as my invention:

1. In a record player having a casing, the combination of a tone arm, means for mounting said tone arm for movement about a vertical axis, an arm pivoted to said casing to swing about a horizontal axis and carrying said mounting means, a spring biased directly between said casing and said arm, said spring actuating said arm into a fixed upper position in which said position said tone arm is in playing position, and means for latching said tone arm in biased condition of said spring.

2. In a record player having a casing, the combination of a tone arm, means for mounting said tone arm for movement about a vertical axis, an arm pivoted to said casing to swing about a horizontal axis and carrying said mounting means, a spring biased directly between said casing and said arm, said spring actuating said arm into a fixed upper position in which said position said tone arm is in playing position, means for latching said tone arm in biased condition of said spring, and manually operable means for releasing said latching means whereby said arm is automatically lifted to said fixed upper position.

3. In a record player having a casing, the combination of a tone arm, means for mounting said tone arm for movement about a vertical axis, an arm pivoted to said casing to swing about a horizontal axis and carrying said mounting means, a spring biased directly between said casing and said arm, said spring actuating said arm into a fixed upper position in which said position said tone arm is in playing position, means for latching said tone arm in biased condition of said spring, manually operable means for releasing said latching means whereby said arm is automatically lifted to said fixed upper position, and means for latching said arm in said fixed upper position.

4. In a record player having a casing, the combination of a tone arm, means for mounting said tone arm for movement about a vertical axis, a frame attached to said casing, an arm pivoted to said frame to swing about a horizontal axis and carrying said mounting means, a spring biased between said frame and said arm to normally lift said mounting means to position said tone arm in playing position, a latch member pivoted to said frame having a hook at one end to engage said tone arm to maintain said spring in biased condition and also having a hook at its other end to engage said lift arm and hold it in lifted position when said spring is released from biased position, and a spring arranged to bias said latch member to both latching positions.

5. In a record player of the type wherein a casing is provided having a tone arm receiving recess, the combination of a pivot pin, a tone arm carried by said pin, an operating arm pivoted respectively at its ends to said casing and to said pivot pin to permit said tone arm to be lowered into said recess or raised to playing position, spring means attached directly between said casing and said operating arm for biasing said pin upwardly thereby to move said tone arm to playing position, and a spring controlled latching means for locking said tone arm in either of its two positions.

6. In a record player of the type wherein a casing is provided having a tone arm receiving recess, the combination of a pivot pin, a tone arm carried by said pin, a keeper attached to said tone arm, an operating arm pivoted respectively at its ends to said casing and to said pivot pin to permit said tone arm to be lowered into said recess or raised to playing position, a keeper formed in said operating arm, means biasing said operating arm to project said pin upwardly to move said tone arm to playing position, and a spring controlled latching means for alternately engaging said two keepers according to the position of said tone arm whereby said tone arm is locked in either of its two positions.

7. In a record player of the type wherein a casing is provided having a tone arm receiving recess, the combination of a pivot pin, a tone arm carried by said pin, a keeper attached to said tone arm, an operating arm pivoted respectively at its ends to said casing and to said pivot pin to permit said tone arm to be lowered into said recess or raised to playing position, a keeper formed in said operating arm, means biasing said operating arm to project said pin upwardly to move said tone arm to playing position, a spring controlled latching means for alternately engaging said two keepers according to the position of said tone arm whereby said tone arm is locked in either of its two positions, and means for manually releasing said latching means.

ELWOOD S. MARIS.

REFERENCES CITED

The following references are of record in the file of this patent:

UNITED STATES PATENTS

| Number | Name | Date |
|---|---|---|
| 1,584,184 | Mitchell | May 11, 1926 |
| 2,081,885 | Runyan | May 25, 1937 |
| 2,246,130 | Forstrom | June 17, 1941 |
| 2,268,180 | Blithen | Dec. 30, 1941 |
| 2,335,661 | Gay | Nov. 30, 1943 |